(12) United States Patent
Henze (10) Patent No.: US 10,399,792 B2
(45) Date of Patent: Sep. 3, 2019

(54) CONVEYING DEVICE WITH CONFIGURATION CHANGE

(71) Applicant: INTERROLL HOLDING AG, Sant' Antonino (CH)

(72) Inventor: Herbert Henze, Wermelskirchen (DE)

(73) Assignee: INTERROLL HOLDING AG, Sant' Antonino (CH)

( * ) Notice: Subject to any disclaimer, the term of this patent is extended or adjusted under 35 U.S.C. 154(b) by 0 days.

(21) Appl. No.: 15/567,738

(22) PCT Filed: Apr. 20, 2016

(86) PCT No.: PCT/EP2016/058756
§ 371 (c)(1),
(2) Date: Oct. 19, 2017

(87) PCT Pub. No.: WO2016/169982
PCT Pub. Date: Oct. 27, 2016

(65) Prior Publication Data
US 2018/0086567 A1    Mar. 29, 2018

(30) Foreign Application Priority Data

Apr. 20, 2015 (DE) .......................... 10 2015 106 024

(51) Int. Cl.
*B65G 43/10* (2006.01)
*G05B 19/042* (2006.01)
(Continued)

(52) U.S. Cl.
CPC .............. *B65G 43/10* (2013.01); *B65G 43/00* (2013.01); *G05B 19/0426* (2013.01);
(Continued)

(58) Field of Classification Search
CPC ..................................................... B65G 43/10
See application file for complete search history.

(56) References Cited

U.S. PATENT DOCUMENTS 5,485,590 A * 1/1996 Hyatt ................... G05B 19/054
700/86
6,240,335 B1 * 5/2001 Wehrung ........... G05B 19/4182
198/571
(Continued)

FOREIGN PATENT DOCUMENTS

AT          13066       5/2013
DE       202012000793    4/2012
(Continued)

*Primary Examiner* — Thomas Randazzo
(74) *Attorney, Agent, or Firm* — Price Heneveld LLP (57) ABSTRACT

The invention relates to a conveying device for conveying objects comprising a plurality of conveyor segments, each conveyor segment having a control unit for controlling the conveyor drive, and a bus communication, wherein each control unit is connected to the bus communication. Each control unit has a microprocessor for processing control signals, a first electronic memory connected to the microprocessor, in which a first control configuration is stored, and a second electronic memory in which a second control configuration is stored. The microprocessor is adapted to control the conveyor drive in a first operating mode with the control configuration stored in the first memory, to load the second control configuration from the second memory into the first memory when a configuration change command is received, and to control the conveyor drive in a first operating mode with the control configuration stored in the first memory.

20 Claims, 2 Drawing Sheets

(51) Int. Cl.
*G05B 19/418* (2006.01)
*G05B 19/05* (2006.01)
*B65G 43/00* (2006.01)

(52) U.S. Cl.
CPC ....... *G05B 19/056* (2013.01); *G05B 19/4186* (2013.01); *G05B 19/4189* (2013.01); *G05B 19/41845* (2013.01); *G05B 2219/23193* (2013.01); *G05B 2219/25092* (2013.01); *G05B 2219/25204* (2013.01); *G05B 2219/2621* (2013.01); *Y02P 90/16* (2015.11); *Y02P 90/185* (2015.11); *Y02P 90/265* (2015.11)

(56) References Cited

U.S. PATENT DOCUMENTS

| | | | | |
|---|---|---|---|---|
| 6,633,278 | B1 * | 10/2003 | Hoegener | G05B 19/056 345/172 |
| 6,701,214 | B1 * | 3/2004 | Wielebski | B65G 37/02 198/460.1 |
| 7,207,433 | B2 | 4/2007 | Schaefer | |
| 8,757,363 | B2 | 6/2014 | Combs et al. | |
| 2002/0010527 | A1 * | 1/2002 | Wielebski | B65G 37/02 700/230 |
| 2003/0168316 | A1 * | 9/2003 | Knepple | B65G 37/02 198/460.1 |
| 2004/0144623 | A1 | 7/2004 | Newsom et al. | |
| 2006/0293782 | A1 * | 12/2006 | Rees | B65G 47/261 700/230 |
| 2008/0270427 | A1 * | 10/2008 | Franke | G05B 19/0426 |
| 2010/0322473 | A1 * | 12/2010 | Taylor | B65G 43/10 382/103 |
| 2012/0175223 | A1 * | 7/2012 | Breen | B65G 43/10 198/459.8 |
| 2012/0175225 | A1 * | 7/2012 | Breen | B65G 43/10 198/571 |
| 2013/0134017 | A1 * | 5/2013 | Hall | B65G 43/00 198/794 |
| 2014/0156063 | A1 * | 6/2014 | Neiser | B65G 43/10 700/230 |
| 2014/0277698 | A1 * | 9/2014 | Combs | B65G 43/10 700/230 |
| 2015/0151921 | A1 * | 6/2015 | Collot | B65G 43/10 700/230 |
| 2016/0080526 | A1 | 3/2016 | Meyer-Graefe | |
| 2016/0318714 | A1 * | 11/2016 | Reischl | H04L 61/2038 |

FOREIGN PATENT DOCUMENTS

| | | | |
|---|---|---|---|
| DE | 102010044027 | 5/2012 | |
| DE | 102011004802 | 8/2012 | |
| DE | 102015106026 | 8/2016 | |
| DE | 102015106034 | 10/2016 | |
| DE | 102015106024 | 11/2016 | |
| DE | 102015107167 | 11/2016 | |
| DE | 102008053557 B4 * | 7/2017 | .......... G05B 19/042 |
| EP | 1454851 | 9/2004 | |
| EP | 1656312 | 5/2006 | |
| EP | 2455310 | 5/2012 | |
| JP | 2003104534 | 4/2003 | |
| JP | 2014516895 | 7/2014 | |
| JP | 2014142740 | 8/2014 | |
| WO | 0203153 | 1/2002 | |
| WO | 2012113922 | 8/2012 | |
| WO | WO-2012113922 A1 * | 8/2012 | ............ B65G 13/04 |
| WO | 2012154650 | 11/2012 | |
| WO | 2013000006 | 1/2013 | |
| WO | 2014057984 | 4/2014 | |
| WO | 2016169982 | 10/2016 | |
| WO | 2016169986 | 10/2016 | |
| WO | 2016177906 | 10/2016 | |
| WO | 2014178399 | 2/2017 | |

* cited by examiner

CONVEYING DEVICE WITH CONFIGURATION CHANGE

CROSS-REFERENCE TO FOREIGN PRIORITY APPLICATION

The present application claims the benefit under 35 U.S.C. § 119(b) of PCT/EP2016/058756, filed Apr. 20, 2016, which claims priority to German Application No. 102015106024.8, filed Apr. 20, 2015, entitled "Conveying Device with Configuration Change."

FIELD OF THE INVENTION

The invention relates to a conveying device for conveying objects such as containers or parcels, comprising a plurality of conveyor segments, each conveyor segment having a control unit for controlling the conveyor drive and a bus communication, wherein each control unit is connected to the bus communication to send and/or receive control signals via bus communication. Another aspect of the invention concerns a method for controlling a conveying device for conveying objects such as containers or parcels, said conveying device comprising a plurality of conveyor segments, each conveyor segment having a conveyor drive, and a control unit having a microprocessor for controlling the conveyor drive, and bus communication to which the control units are connected. The method comprises the step of storing a first control configuration in a first electronic memory connected in the control unit to the microprocessor.

BACKGROUND OF THE INVENTION

Conveying devices and methods for controlling such conveying devices of the kind initially specified are used to convey objects, such as pallets, boxes, suitcases, postal items, and the like, in intra-logistic applications. The conveyor lines involved are composed of multiple conveyor segments arranged one after the other in series. Each conveyor segment has a conveyor drive that can be driven individually, for which purpose each conveyor segment is equipped with a control unit. In principle, each conveyor segment can have a separate control unit disposed in a housing, or the control units for several neighbouring conveyor segments may be combined in a common control module.

The control units or control modules are interconnected via bus communication. This bus communication is used to transmit signals relating to the conveying of objects on the conveyor line of conveying devices. It is possible, in particular, for signals to be transmitted that signal the presence of an object in a particular conveyor segment. Such a presence signal or busy signal can be detected by means of a sensor, for example, such as a photoelectric barrier that is connected to the control unit of the conveyor segment. Drive signals for activating a conveyor drive are also transmitted via bus communication, and other signals, for example, for merges, diverts, elevators and the like, can also be transmitted, if need be.

Equipping such conveying devices with a central controller is basically known from the prior art. In such a central control system, a centrally arranged controller, for example a PLC controller, is responsible for controlling the conveying process within the conveying device or within a section of the conveying device. For that purpose, the central control device sends commands to the individual control units via bus communication, and those commands typically include an activation signal for the conveyor drive, a deactivation signal for the conveyor drive, parameter specifications for the speed of the conveyor drive, and the like. For its part, the central controller receives signals, for example a "busy" signal, from the control units. In this kind of central control system, all the logical handling of the conveying process is performed in the central controller, and the individual control units merely serve to pass on signals and to modulate signals, where relevant.

In addition to this centralised form of control, a decentralised form of control is also known. In a decentralised control system, logical handling of the conveying process is delegated to the individual control units. To that end, the control units exchange signals among each other, for example, neighbouring control units may be informed that the next downstream conveyor segment, at least, is busy or is ready to receive goods. Depending on the kind of signal thus received about the neighbouring downstream conveyor segment being busy or having an uptake capacity, a control unit activates the conveyor drive connected to it, in order to transport the objects over the conveyor line without collisions occurring.

To prevent damage to the conveyed objects, a zero-pressure conveying mode is preferably controlled. This means that the conveyed objects never come into contact with each other on the conveyor line, thus preventing a downstream object from being damaged by the potentially strong forces that can result from the addition of conveying forces in several objects abutting each other. In a zero-pressure conveying mode, a basic distinction is made between different operating modes, namely single take-off mode, in which an object is conveyed from one conveyor segment to the next downstream conveyor segment as soon as the latter has forwarded the object lying on it, and block take-off mode, in which a conveyor segment activates its conveyor drive as soon as the conveyor drive of the neighbouring downstream conveyor segment is activated. In principle, these two operating modes can be implemented with a centralised form of control and also with a decentralised form of control. In order to control the conveyor drives in accordance with these two operating modes, or in accordance with some other type of conveying which is implemented as a mixed mode or a completely different kind of control, it is necessary for signals, such as control commands, busy signals and the like, to be communicated via bus communication.

A bus protocol is a basic requirement for bus communication. The bus protocol stipulates the form in which signals must be sent via bus communication, so that they arrive reliably at a recipient, can be interpreted by the recipient as a signal addressed to it, and so that the information contained in the signal can be read out. Central controllers are basically available in different variants that use different forms of control and which operate according to different bus protocols. Some examples of commonly used bus protocols are TCP/IP, Profibus, and CAN.

The basic choice between centralised control and decentralised control, and between the different variants of centralised and decentralised control, which entail logistics processes being shifted to a greater or lesser extent from a central controller to a decentral control unit, between different control modes in the form of single take-off, block take-off or mixtures thereof, and between the different ways of communicating with different bus protocols provide enormous variety and design freedom in the composition of intra-logistic conveying systems, which is initially advantageous, in principle. Within a defined system, in which the control hierarchy, the manner of control, and the communication protocol are all defined, the system specifications necessitated as a result allow control units to be produced that are customised for the respective system and therefore optimised with regard to production costs. Due to the very large number of control units that must be installed in larger conveyor systems, these control units account for a significant proportion of the total costs of the conveyor system and are subject as a consequence to considerable pressure to minimise costs.

One disadvantage of the enormous variety that conveyor systems fundamentally show, however, is that system components from different conveyor systems are interchangeable to only a minimal extent, if at all. It is generally impossible for the user of such conveying devices to combine components of conveyor systems made by different manufacturers, or it is necessary for components to be individually adapted. There are often incompatibilities even between components of different generations of conveyor systems made by one and the same manufacturer. The consequence is that, although customised and therefore cost-efficient, components such as the control units, conveyor drives, and any central controllers that may be required can be produced and are available for each conveyor system, this involves extensive storage facilities provided for the individual system components, to ensure that replacements for defective components, or additional components required for the expansion or restructuring of existing systems, can subsequently be supplied. Such extensive storage facilities and the concomitant need to provide production capacities for a large number of different conveyor systems, causes additional costs for the manufacturers of such conveying devices. This stands in contradiction to the actual aim of providing such conveying devices cost-efficiently.

SUMMARY OF THE INVENTION

The invention addresses this basic problem of providing customised conveyor systems for particular applications, on the one hand, while on the other hand overcoming the diversity of variants and the resultant limitations with regard to compatibility.

According to the invention, a conveying device of the kind initially specified is provided, which is improved in this respect and which reduces, with a cost-efficient and systems-based solution, the need to store a large number of different system components. This is achieved by the conveying device specified at the outset, in which each control unit has a microprocessor for processing control signals, a first electronic memory connected to the microprocessor, in which a first control configuration is stored, and a second electronic memory, in which a second control configuration different from the first control configuration, and preferably a plurality of control configurations different from the first, are stored, wherein the microprocessor is adapted to control the conveyor drive in a first operating mode with the control configuration stored in the first memory, or any control configuration different from the first from the second memory into the first memory when a configuration change command is received, and after that to control the conveyor drive in a second operating mode with the second or any control configuration different from the first.

According to the invention, two electronic memories which serve different purposes and which can be controlled, interrogated, and managed by means of the microprocessor, are provided in the control units of the conveying device according to the invention. The first and the second memory may differ from each other in respect of their physical principle or structure, their reading speed and/or their storage capacity.

The first memory is used to store the respective control configuration being used, which is the first control configuration. The microprocessor processes the control signals in accordance with this first control configuration when the conveying device is in operation, that is to say, the microprocessor operates, for example, according to a bus protocol, a form of control, or according to control parameters that are defined in this first control configuration. The first memory is a memory with fast read access, in particular, in order to ensure that the control and conveying operation proceeds without delays. The first memory may form an integral part of the microprocessor, for example.

The second electronic memory may have a slower read access compared to the first memory, but it should preferably have a greater storage capacity than the first memory. At least one second control configuration different from the first control configuration is stored in the second memory. It is particularly preferred that several control configurations differing from each other and from the first control configuration are stored in the second electronic memory. These control configurations in the second electronic memory constitute a contingent which can be loaded into the first electronic memory as an alternative to the first control configuration, in order to operate the control unit according to a different control configuration. It should be understood, as a basic principle, that both the first control configuration as well as the second or the other different configurations can be programmed in advance into the first electronic memory and the second electronic memory, respectively, that is, that they are already stored in the control unit as a factory default. It should also be understood that it is basically possible as well that these control configurations are stored in the first and the second electronic memory during ongoing operation, or in the course of a programming step during installation of the conveying device according to the invention, or in the course of an updating step following successful installation of the conveying device according to the invention. This can be done as a firmware update, for example, in which control configurations in the first and/or the second memory are added to or replaced. It is particularly preferred that the first, the second, and all other control configurations are stored and remain in the second memory, and that the first or the most recently used control configuration is loaded from the second memory into the first memory every time the conveying device is started up.

This enables the conveying device according to the invention to be operated in at least two different operating modes, i.e., in the first or in the second operating mode. In particular, it allows the conveying device according to the invention to be operated in many different operating modes according to the several different control configurations that are stored in the second electronic memory. Due to the addition of a second electronic memory in each control unit, the invention thus provides a simple way of configuring the control unit in order to adapt the control units to different operating modes and thus to enable them to control the respective conveyor segment in accordance with different bus protocols, different types of control (i.e., centralised or decentralised), and different forms of control (i.e., single take-off or block take-off) and to perform the communication that is necessary for such control. A control unit is thus provided that can be universally used, manufactured at little incremental cost, and adapted simply and quickly to the operating mode that is specifically required in a particular case. This adaptation can be triggered by the configuration change command. The configuration change command can be entered directly at the control unit, for example, via a user interface, for which purpose appropriate knobs, buttons, or other triggering mechanisms may be provided on the control unit. Alternatively, the configuration change command can be sent to the control unit via bus communication, thus allowing simultaneous and ergonomically efficient changes of configuration in multiple control units or in all the control units of the conveying device.

According to a first preferred embodiment, the microprocessor is adapted to replace the first control configuration from the first electronic memory with the second or any other control configuration different from the first and loaded from the second memory into the first memory, when the configuration change command is received. In this embodiment, the first control configuration in the first electronic memory is replaced, when a configuration change command to that effect is received, by a control configuration that is different from the first and which is loaded from the second electronic memory into the first electronic memory.

It is also preferred that the first electronic memory is a volatile or non-volatile memory, in particular a flash memory, and that the second electronic memory is a non-volatile memory, in particular a flash memory. This specific selection of the first and second memory allows a fast memory element, namely a volatile memory element such as a Random Access Memory (RAM), to be used as the first memory, thus achieving fast signal processing for ongoing operation of the conveying device. This first, RAM-type electronic memory does not need to have a particularly high storage capacity, according to the invention, because all that has to be stored in it is the respective control configuration required for the actual operating mode. In contrast to that, the second electronic memory is provided in the form of a flash memory. Such a flash memory is distinguished by slower signal transmission compared to RAM memory, but it can be produced very cost-efficiently and with a high storage capacity. It is, therefore, possible for many different control configurations to be stored cost-efficiently in the second electronic memory, without the delay in reading out the flash memory having any disadvantageous effects on normal operation of the conveying device according to the invention. [Media which can be connected to a data interface of the control unit, for example, memory cards such as SD cards, compact flash cards, and the like, can be also considered as flash memories. The control unit according to the invention does not necessarily have to be fitted with a fixedly installed second memory; the second electronic memory can also be implemented by an appropriate electronic interface for connecting a memory element.] The second memory needs to be readable only when there is a change of operating mode, in which case the lower read speed of a second memory is non-critical.

It is also preferred that the first control configuration includes a first bus protocol for configuring the data communication via the bus communication, and the second or other control configuration different from the first includes a second bus protocol different from the first for configuring the data communication via the bus communication. According to this embodiment, it is possible to select from two different bus protocols by changing the control configuration. This enables the control unit or conveying device according to the invention to operate selectively with at least two, preferably with several different bus protocols and to communicate via bus communication in accordance with a bus protocol selected therefrom. It should be understood, as a basic principle, that by means of the bus protocol, it is possible to adapt transmission between the control unit or within the conveying device to different transmission media (e.g., radio, waveguides, Ethernet, CAN, RS 485, RS 232) and to different communication protocols (e.g., TCP/IP, CAN, Ethernet/IP, Profinet, Profibus, Modbus).

It is still further preferred that the first control configuration includes a first control method which configures the microprocessor to receive control commands via bus communication and to route said control commands to the conveyor drive in a central control mode, and the second or other control configuration different from the first includes a second control method different from the first, which configures the microprocessor to receive a busy signal and/or a conveying signal from a control unit of a neighbouring conveyor segment and to logically generate a control command in the microprocessor from said busy signal and/or conveying signal and to send said control command to the conveyor drive in a decentral control mode. This preferred embodiment provides the conveying device according to the invention, or the control unit used therein, with a multifunction capability. By adapting the control configurations accordingly to different types of control, for example, decentralised control or centralised control, the control units can be adapted and configured to route signals or to perform logic signal processing decentrally. Compared to the solutions known hitherto, in which control programs are stored in read-only memories inside the control unit and therefore cannot be changed, it is possible according to the invention for a large number of different control configurations, for example, more than 100, to be stored in the second electronic memory and for each of these control configurations to be loaded selectively into the first electronic memory in order to induce a respective operating mode. The control configurations preferably include, in the form of status tables, the description of the conveying process, in that the control processes are described as state machines in those status tables. This means that storing the control processes requires a very compact amount of memory compared to machine commands that are otherwise necessary and, thus, that a microcontroller with relatively little memory capacity can be installed in the first electronic memory in the control unit.

According to another preferred embodiment, the first control configuration includes a first control method which configures the microprocessor to control a first conveying mode, and the second or other control configuration different from the first includes a second control method different from the first, which configures the microprocessor to control a second conveying mode different from the first, wherein the first and/or second conveying mode is preferably selected from a single take-off mode in which the microprocessor activates the conveyor drive of a conveyor segment when it receives a signal indicating that a neighbouring downstream conveyor segment is not busy, a block take-off mode in which the microprocessor activates the conveyor drive of a conveyor segment when it receives a signal indicating that the conveyor drive or a neighbouring downstream conveyor segment is activated, a transfer mode in which the microprocessor is configured to control a conveyor drive and a transfer drive which horizontally inserts or ejects the conveyed object from the conveyor segment, a lift mode in which the microprocessor is configured to control a conveyor drive and a lift drive which vertically inserts or ejects the conveyed object from the conveyor segment, and a sort mode in which the microprocessor is configured to receive a sorting signal and to control a conveyor drive and a sorting drive which sorts the conveyed object according to the received sorting signal into at least two, preferably into a plurality of, different exits from the conveyor segment.

According to this embodiment, it is possible to select from two different conveying modes that are stored in the second electronic memory. This allows the conveyor segments in a conveyor line to be rapidly configured in one of several possible conveying modes. They can also be configured in such a way that individual conveyor segments are configured with differing conveying modes. A conveying mode should be understood here as a mode of operation which defines a process of conveying the objects, on the basis of a predefined bus protocol and a predefined, decentralised control configuration. Such a conveying process can be implemented, in particular, by zero pressure accumulation (ZPA) modes of operation, in which the individual conveyor segments are controlled in such a way that the objects are conveyed without coming into contact with one another. This can take the form of single take-off, for example, in which an object is conveyed to the next downstream conveyor segment exactly when the next conveyor segment is free, which is typically detected and signalled by a respective sensor in the next conveyor segment. Block take-off may also be configured as a ZPA operating mode, in which an object is conveyed into the next downstream conveyor segment at exactly the moment in which the object on the next conveyor segment is passed on, which is typically detected and signalled by a respective activation signal from the conveyor drive of the next conveyor segment. Other conveying modes relate to specific conveyor segments with additional functions, such as switch points (with merge or divert functions), elevator systems, a sorting function using a code reader, and a system for distribution to two or more alternative conveyor segment exits, and the like. In these cases, the control unit performs the additional control functions for such conveyor segments via additional signal inputs and/or outputs.

According to another preferred embodiment, the conveying device includes a manual user interface connected to the microprocessor, and the microprocessor is adapted to process a signal received as a configuration change command via the user interface. It should be understood, as a basic principle, that all the configuration processes within the controller according to the invention can be carried out by connecting a separate configuration computer, or by a software control system on a central control computer which is connected to the bus communication. However, the necessity of connecting a central computer for configuration purposes can be avoided, according to this embodiment, by equipping the control units with a user interface that allows a configuration change command to be entered. This manual user interface can be provided in the form of a mechanical pushbutton, actuator button, touchscreen, or the like, and, in particular, as a binary switch having two states, or a multi-switch having several states.

According to a particularly preferred embodiment in this regard, the manual user interface is a switch which can be triggered with a magnetic signal, in particular a Reed contact or a Hall effect sensor. Such a switch, which can be triggered with a magnetic signal, can reliably prevent a configuration change command being entered inadvertently, for example, by inadvertently touching a switch or pushbutton. With such a magnetically operated switch, it is possible, in particular, to ensure that a configuration is changed only by authorised persons, for example, in that the switch can only be triggered by a magnetic field strength which is within a specific range defined by a lower and an upper limit, and by such a magnet for triggering the switch being issued only to persons who have the respective authorisation.

According to another preferred embodiment, the conveying device includes a visual user interface connected to the microprocessor for visually displaying signals, and the microprocessor is adapted to display via the visual user interface an indication and/or a selection of the first and second or other different control configuration. Such a visual user interface extends the functionality of the control units as independent entities, as described above, and allows a status of a control unit to be displayed directly to the user where the control unit is located. The visual user interface may take the form of single LEDs, which emit particular signals as indicated by their labels or as described in a user manual. Other forms of visual user interface are also conceivable, for example, liquid crystal display (LCD) screens. In particular, the visual user interface may also be combined with the manual user interface, for example in the form of a touchscreen or the like, in order to provide the two user interfaces in a particularly efficient and space-saving form.

According to an embodiment that is preferred in that regard, the microprocessor is adapted to receive via the manual user interface a selected control configuration displayed on the visual user interface. This development of the invention allows a particular control configuration to be selected by means of the manual user interface and said selection to be made and monitored by displaying the control configuration via the visual user interface. This variant can be realised in different ways, for example, in the form of different menu levels that are selected using the manual user interface and within which it is possible to navigate and make selections using the manual user interface. The manual user interface may also be adapted so that different commands are carried out by different kinds of trigger, for example, short or long triggering, or multiple successive triggering, or single triggering, with the result that different menu levels are entered or different selections are made.

It is particularly preferred in this regard that the microprocessor is adapted to control via the manual user interface and to indicate via the visual user interface a first selection level for selecting between bus protocol selection or control method selection, and when bus protocol selection is selected in the first selection level to control and to display on the visual user interface a second selection level for selecting between different bus protocols, and when control method selection is selected in the second selection level to control and to display on the visual user interface the second selection level for selecting between control methods. By developing the invention in this way, it is possible via the manual user interface and the visual user interface to make a selection not only with regard to a bus protocol, but also with regard to a control method, and in this way to configure the control unit individually and in such a way that it can be deployed in a respective conveying device, without having to connect it to a computer in order to set it up. The microprocessor can also be adapted so that other operating functions can be selected and/or controlled using the manual user interface and displayed via the visual user interface, for example, a self-test, or a reset to a preconfigured factory default.

Another aspect of the invention concerns a method for controlling a conveying device for conveying objects such as containers or parcels, said conveying device comprising a plurality of conveyor segments, each conveyor segment having a conveyor drive and a control unit having a microprocessor for controlling the conveyor drive, and bus communication to which the control units are connected, said method comprising the steps of: storing a first control configuration in a first electronic memory connected in the control unit to the microprocessor, storing a second control configuration different from the first, and preferably a plurality of control configurations different from the first, in a second electronic memory in the control unit, processing control signals in the microprocessor and controlling, in a first operating mode, a conveyor drive according to the control configuration, receiving a configuration change command, loading the second or other control configuration different from the first from the second memory into the first memory, in particular, replacing the first control configuration with the second or other control configuration different from the first, and after that processing control signals in the microprocessor and controlling a conveyor drive according to the second or other control configuration different from the first, in a second operating mode. The method may be developed in this regard such that the first control configuration includes a first bus protocol for configuring data communication via bus communication, and the control unit sends and/or receives via bus communication in accordance with the first bus protocol, in the first operating mode, and the second or other control configuration different from the first includes a second bus protocol different from the first and the control unit sends and/or receives via bus communication in accordance with the second bus protocol, in the second operating mode.

The method may also be developed such that the first control configuration includes a first central control method, and the microprocessor receives control commands via bus communication in the first operating mode and routes said control commands to the conveyor drive and the second or other control configuration different from the first includes a second control method different from the first, and in the second operating mode the microprocessor receives a busy signal and/or a conveying signal from a control unit of a neighbouring conveyor segment, logically processes said busy signal and/or conveying signal, generates a control command in said logical processing, and sends said control command to the conveyor drive.

The method can also be developed such that the microprocessor receives the configuration change command via a manual user interface at the control unit, in particular by triggering of a switch, in particular a Reed contact, with a magnetic signal.

The method can also be developed such that the microprocessor emits, via a visual user interface, a signal for displaying and/or selecting the first and second or other different control configuration.

The method can also be developed such that the microprocessor receives, via the manual user interface, a selected control configuration displayed on the visual user interface.

The method may also be developed such that the microprocessor receives via the manual user interface and displays on the visual user interface a signal for a first selection level between bus protocol selection or control method selection, and when bus protocol selection is selected in the first selection level, receives via the manual user interface and displays on the visual user interface in a second selection level a signal for selecting between different bus protocols, and when control method selection is selected in the first selection level, receives via the manual user interface and displays on the visual user interface in a second selection level a signal for selecting between different control methods.

The method may also be developed such that, in the first control configuration, the conveying device controls a first conveying mode via the microprocessor, and in the second or other control configuration different from the first, the conveying device controls a second conveying mode different from the first via the microprocessor, wherein the first and/or second conveying mode is preferably selected from a single take-off mode in which the microprocessor activates the conveyor drive of a conveyor segment when it receives a signal indicating that a neighbouring downstream conveyor segment is not busy, a block take-off mode in which the microprocessor activates the conveyor drive of a conveyor segment when it receives a signal indicating that the conveyor drive or a neighbouring downstream conveyor segment is activated, a transfer mode in which the microprocessor is configured to control a conveyor drive and a transfer drive which horizontally inserts or ejects the conveyed object from the conveyor segment, a lift mode in which the microprocessor is configured to control a conveyor drive and a lift drive which vertically inserts or ejects the conveyed object from the conveyor segment, and a sort mode in which the microprocessor is configured to receive a sorting signal and to control a conveyor drive and a sorting drive which sorts the conveyed object according to the received sorting signal into at least two, preferably into a plurality of different exits from the conveyor segment.

With regard to the method of control and the individual steps involved, reference is made to the previously described and corresponding features of the conveying device and to the variants, advantages and preferred embodiments thereof which have also been described.

BRIEF DESCRIPTION OF THE DRAWINGS

A preferred embodiment of the invention shall now be described with reference to the attached Figures, in which.

DETAILED DESCRIPTION OF THE PREFERRED EMBODIMENTS

As referenced in the Figures, the same reference numerals may be used herein to refer to the same parameters and components or their similar modifications and alternatives. For purposes of description herein, the terms "upper," "lower," "right," "left," "rear," "front," "vertical," "horizontal," and derivatives thereof shall relate to the present disclosure as oriented in FIG. 1. However, it is to be understood that the present disclosure may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise. The drawings referenced herein are schematic and associated views thereof are not necessarily drawn to scale.

Figure 1:
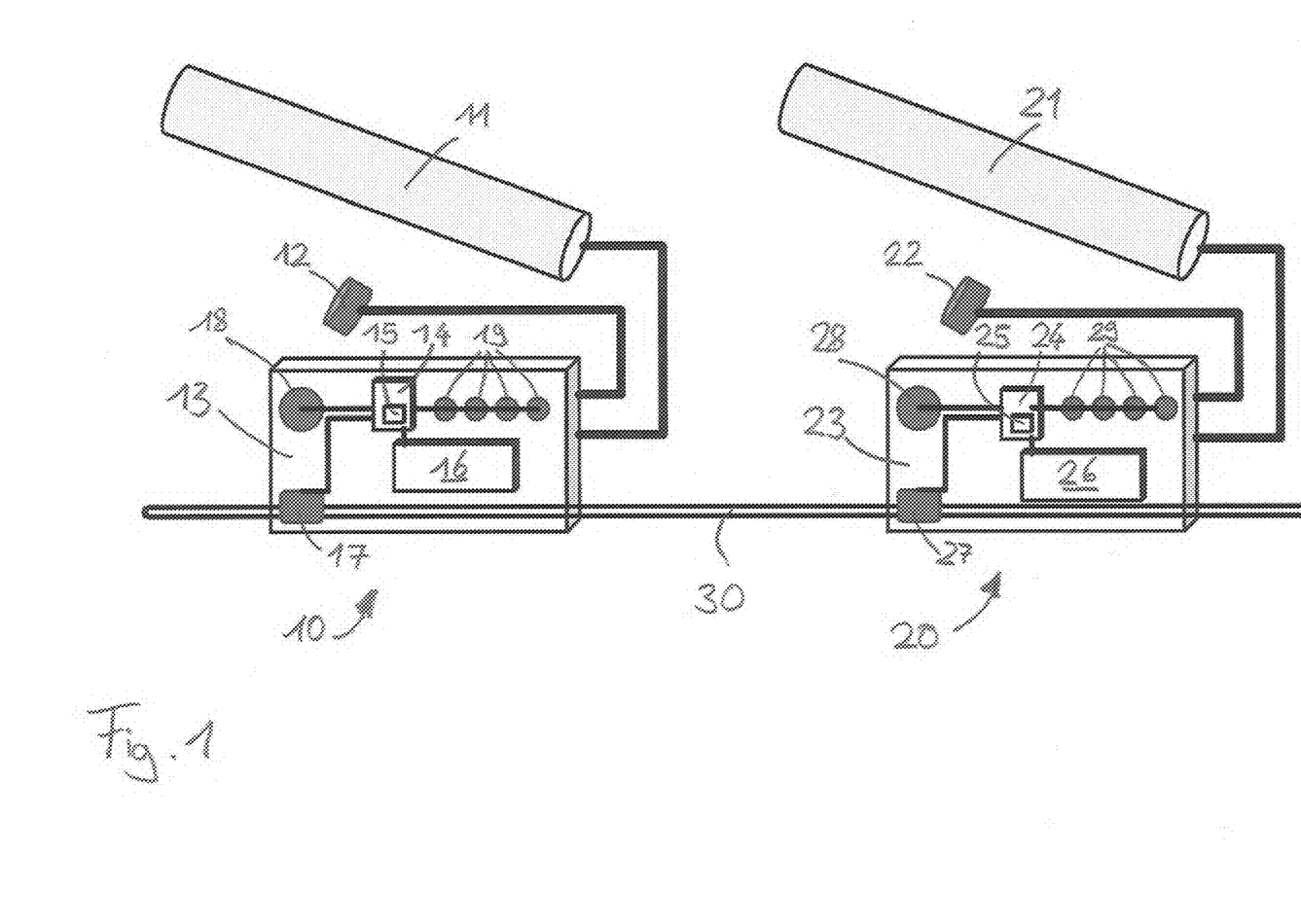
FIG. 1 is a schematic view of a section of a conveying device according to the invention.

Referring to FIG. 1, a conveying device according to the invention comprises a plurality of conveyor segments, of which two conveyor segments 10, 20 are shown in FIG. 1. Each conveyor segment has a motorised roller 11, 21, a photoelectric barrier sensor 12, 22, and a control unit 13, 23, that is connected via respective electric leads to the motorised roller and the photoelectric barrier sensor in the respective conveyor segment.

Control units 13, 23 are connected to each other by means of a bus line 30, that is connected to the control units by means of a respective connecting unit 14, 24.

Each control unit has a CPU 15, 25, a RAM 16, 26, and a flash memory 17, 27 The flash memory 17,27 is embodied in the form of an integrated circuit or an SD card in a respective hardware interface. The RAM 16, 26 and the CPU 15, 25 are integrally embodied. A switch or pushbutton 18, 28, preferably a magnetic sensor, and in particular a Hall sensor, is arranged at each control unit, so that a user can trigger the Hall sensor 18, 28 externally by holding a magnet close to it.

The conveying device shown in FIG. 1 can basically be controlled in such a way that an object is conveyed by motorised roller 11 into the area of motorised roller 21 and conveyed further by motorised roller 21. The photoelectric barrier sensors 12, 22 firstly register that conveyor segment 10 is busy and subsequently, after the object has been conveyed further, that conveyor segment 20 is busy. These busy signals are sent by the photoelectric barrier sensors 12, 22 to the respective control units 13, 23.

In a centralised control method, control can be carried out in such a way that control commands are sent to control unit 13, 23 by a PLC controller (not shown) connected to bus line 30, and that the sensor signals from sensors 12, 22 are sent via control units 13, 23 and bus lines 30 to the PLC controller. The SPS decides, in a series of logic operations, which conveyor segment is to convey the object, sends a conveyor drive signal to that effect via bus line 30 to the respective control unit 13 or 23, and control unit 13, 23 transmits the control signal directly to the respective conveyor drive 11, 21, connected thereto.

In contrast to that control method, the conveyor segments can also be operated with a decentralised control method. In this case, for example, control unit 23 communicates a "not busy" signal from photoelectric barrier sensor 22 via bus line 30 to control unit 13, in response to which control unit 13 makes a logic decision with processor 14 that an object detected on the basis of a "busy" signal from sensor 12 in conveyor segment 10 can be conveyed further by activating conveyor drive 11. Control unit 13 then sends an acknowledgement signal to conveyor drive 11 and lets the conveyor drive run for a predetermined period of time in order to convey the object into conveyor segment 20. It can also be stipulated by the programmed logic in processor 14 that conveyor drive 11 is activated when a control unit 23 signals via the bus line that conveyor drive 21 has been activated, with the result that synchronous block take-off is controlled instead of the single take-off mode as previously described.

Figure 2:
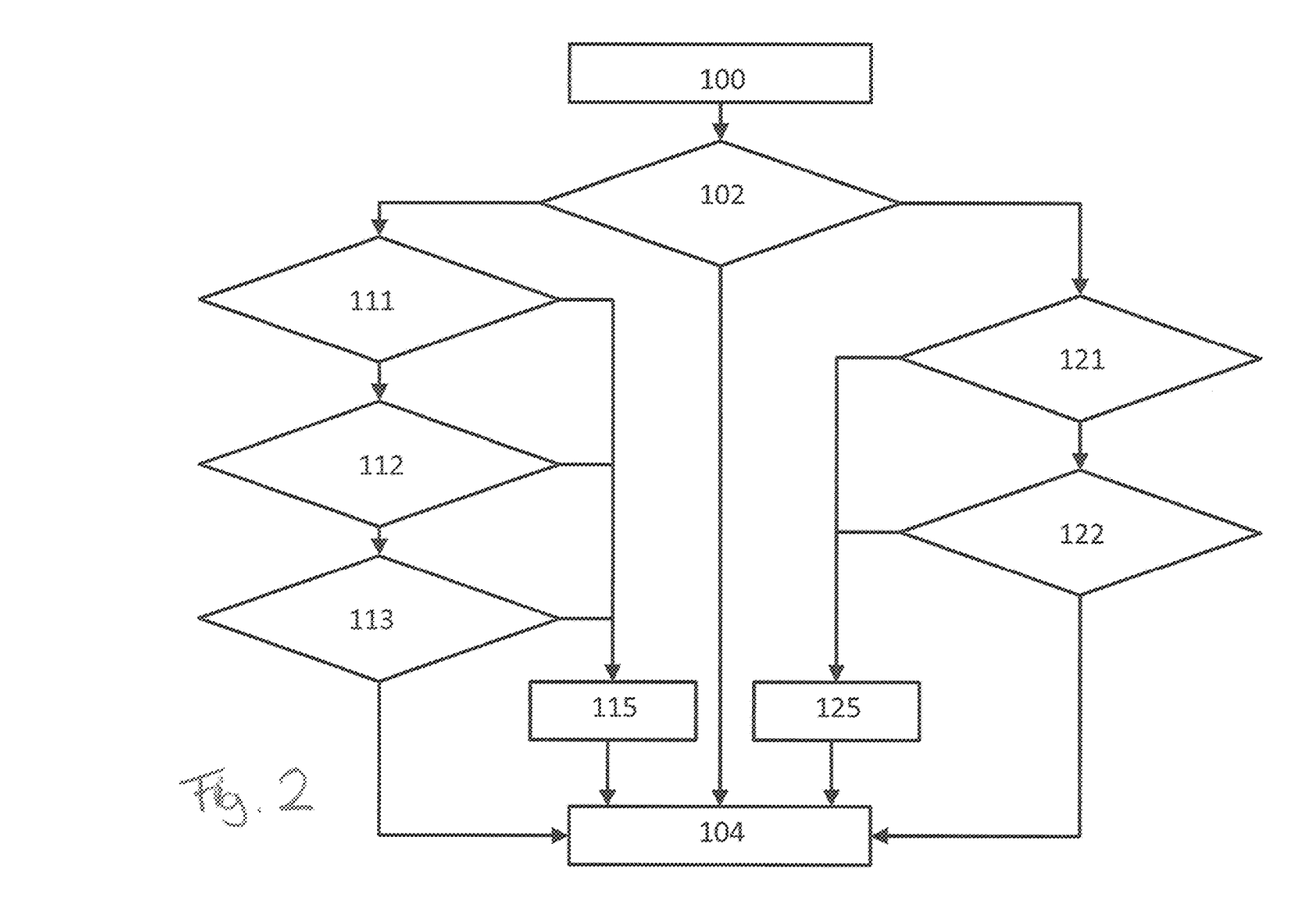
FIG. 2 is a flow diagram for selecting a control configuration in a conveying device according to the invention.

The control units according to the invention can be configured to carry out these different control methods in different bus protocol systems. One such configuration is shown in FIG. 2.

In this configuration procedure, Hall sensor 18 or 28, respectively, is triggered in a first step 100, thus putting the control unit into a configuration mode. In a decision-making step 102, the CPU indicates to the user, by flashing two LEDs alternatingly on the visual user interface, that a selection can be made between configuring the bus protocol or configuring the control method, and waits for the Hall sensor 18 to be triggered again. If the Hall sensor 18 is triggered again due to activation of the LED for bus protocol configuration, the configuration menu jumps to the next decision 111, and if the Hall sensor 18 is activated again due to activation of the LED for configuration of the control method, the configuration menu jumps to the next decision 121. If the Hall sensor 18 has not been triggered again by the time the LEDs for the two configuration menus have been alternatingly activated five times, the configuration menu jumps straight to exit 104, and the control unit is once again put into the normal operating mode for activation of a conveying operation.

In the menu level for configuring the bus protocol, a TCP/IP protocol is firstly displayed via the graphical user interface, in a first decision-making step, by activating a specific LED. If the Hall sensor 18 is triggered again while that LED is activated, the configuration menu jumps to configuration change step 115 and changes the bus protocol to a TCP/IP bus protocol configuration. If, in contrast, the Hall sensor 18 is not triggered within five seconds, the configuration menu jumps to the next decision step 112. In decision step 112, the graphical user interface indicates, by activating a different respective LED, a CAN bus protocol which could be selected, as before, by activating the Hall sensor 18 again within five seconds, which would result in configuration menu jumping to configuration change step 115. If once again there is no triggering of the Hall sensor 18 within the five-second period, the configuration menu jumps to the next decision step 113, in which a Profibus protocol is indicated by activation of the respective LED, and can be selected accordingly. If no selection is made this time, either, the configuration menu jumps straight to exit 104, and the conveyor system is once again put into the normal operating mode.

In a manner analogous to the above procedure, it is possible at the other menu level to select between a centralised control method and a decentralised control method via two decision points 121, 122, and if neither of those two methods is selected, the configuration menu again jumps to exit 104 and keeps the configuration used hitherto. It should be understood, as a basic principle, that other options and branchings can be implemented within the menu levels and menu items, for example to select between block and single take-off, or similar.

It will be understood by one having ordinary skill in the art that construction of the described present disclosure and other components is not limited to any specific material. Other exemplary embodiments of the disclosure disclosed herein may be formed from a wide variety of materials, unless described otherwise herein.

For purposes of this disclosure, the term "operably coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

For purposes of this disclosure, the term "operably connected" (in all of its forms, connect, connecting, connected, etc.) generally means that one component functions with respect to another component, even if there are other components located between the first and second component, and the term "operable" defines a functional relationship between components.

It is also important to note that the construction and arrangement of the elements of the present disclosure as shown in the exemplary embodiments is illustrative only. Although only a few embodiments of the present innovations have been described in detail in this disclosure, those skilled in the art who review this disclosure will readily appreciate that many modifications are possible, e.g., variations in sizes, dimensions, structures, shapes and proportions of the various elements, values of parameters, mounting arrangements, use of materials, colors, orientations, etc. without materially departing from the novel teachings and advantages of the subject matter recited. For example, elements shown as integrally formed may be constructed of multiple parts or elements shown in multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of the wide variety of materials that provide sufficient strength or durability, in any of the wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is to be understood that variations and modifications can be made on the aforementioned structure and method without departing from the concepts of the present disclosure, and further it is to be understood that such concepts are intended to be covered by the following claims unless these claims by their language expressly state otherwise.

The invention claimed is:

1. A conveying device for conveying objects comprising:
a plurality of conveyor segments, each conveyor segment having a conveyor drive and a control unit for controlling the conveyor drive; and
a bus communication,
wherein each control unit is integrated into the bus communication to send and/or to receive control signals via bus communication, and
wherein each control unit comprises:
a microprocessor for processing control signals;
a first electronic memory connected to the microprocessor, in which a first control configuration is stored;
a second electronic memory, in which a second control configuration different from the first control configuration are stored; and
a manual user interface connected to the microprocessor;
wherein the microprocessor is adapted:
to control the conveyor drive in a first operating mode with the control configuration stored in the first memory;
to process a signal received as a configuration change command via the manual user interface;
to load the second control configuration different from the first from the second memory into the first memory when the configuration change command is received from the manual user interface; and
to control the conveyor drive in a second operating mode with the second control configuration different from the first.

2. The conveying device pursuant to claim 1, wherein the microprocessor is adapted to replace the first control configuration from the first electronic memory with the second control configuration different from the first and loaded from the second memory into the first memory, when the configuration change command is received.

3. The conveying device pursuant to claim 1, wherein the first control configuration includes a first bus protocol for configuring a data communication via the bus communication, and the second control configuration different from the first includes a second bus protocol different from the first for configuring the data communication via the bus communication.

4. The conveying device pursuant to claim 1, wherein the first control configuration includes a first control method which configures the microprocessor to receive control commands via bus communication and to route said control commands to the conveyor drive in a central control mode, and
the second control configuration different from the first includes a second control method different from the first, which configures the microprocessor to receive a busy signal and/or a conveying signal from a control unit of a neighbouring conveyor segment and to logically generate a control command in the microprocessor from said busy signal and/or conveying signal and to send said control command to the conveyor drive in a decentral control mode.

5. The conveying device pursuant to claim 1, wherein the first control configuration includes a first control method which configures the microprocessor to control a first conveying mode, and
the second control configuration different from the first includes a second control method different from the first, which configures the microprocessor to control a second conveying mode different from the first;
wherein the first and/or second conveying mode is selected from the group consisting of:
a single take-off mode in which the microprocessor activates the conveyor drive of a conveyor segment when it receives a signal indicating that a neighbouring downstream conveyor segment is not busy;
a block take-off mode in which the microprocessor activates the conveyor drive of a conveyor segment when it receives a signal indicating that the conveyor drive or a neighbouring downstream conveyor segment is activated;
a transfer mode in which the microprocessor is configured to control a conveyor drive and a transfer drive which horizontally inserts or ejects the conveyed object from the conveyor segment;
a lift mode in which the microprocessor is configured to control a conveyor drive and a lift drive which vertically inserts or ejects the conveyed object from the conveyor segment; or
a sort mode in which the microprocessor is configured to receive a sorting signal and to control a conveyor drive and a sorting drive which sorts the conveyed object according to the received sorting signal into a plurality of different exits from the conveyor segment.

6. The conveying device pursuant to claim 1, wherein the manual user interface is a switch which can be triggered with a magnetic signal, including a Reed contact or a Hall sensor.

7. The conveying device pursuant to claim 1, wherein the control unit includes a visual user interface connected to the microprocessor for visually displaying signals, and the microprocessor is adapted to display via the visual user interface an indication and/or a selection of the first and second or other different control configuration.

8. The conveying device pursuant to claim 1, wherein the first electronic memory is a volatile or non-volatile memory, and the second electronic memory is a non-volatile memory.

9. The conveying device pursuant to claim 8, wherein the non-volatile memory of either or both of the first electronic memory or the second electronic memory is a flash memory.

10. The conveying device pursuant to claim 1, wherein the microprocessor is adapted to receive via the manual user interface a selected control configuration displayed on the visual user interface.

11. The conveying device pursuant to claim 10, wherein the microprocessor is adapted to control via the manual user interface and to indicate via the visual user interface a first selection level for selecting between bus protocol selection or control method selection, and
when bus protocol selection is selected in the first selection level, to control and to display on the visual user interface a second selection level for selecting between different bus protocols, and
when control method selection is selected in the second selection level, to control and to display on the visual user interface the second selection level for selecting between a control method which configures the microprocessor to receive control commands via bus communication and to route said control commands to the conveyor drive in a central control mode or different control mode selected from the group consisting of:
a single take-off mode in which the microprocessor activates the conveyor drive of a conveyor segment when it receives a signal indicating that a neighbouring downstream conveyor segment is not busy;
a block take-off mode in which the microprocessor activates the conveyor drive of a conveyor segment when it receives a signal indicating that the conveyor drive or a neighbouring downstream conveyor segment is activated;
a transfer mode in which the microprocessor is configured to control a conveyor drive and a transfer drive which horizontally inserts or ejects the conveyed object from the conveyor segment;
a lift mode in which the microprocessor is configured to control a conveyor drive and a lift drive which vertically inserts or ejects the conveyed object from the conveyor segment; or
a sort mode in which the microprocessor is configured to receive a sorting signal and to control a conveyor drive and a sorting drive which sorts the conveyed object according to the received sorting signal into a plurality of different exits from the conveyor segment.

12. A method for controlling a conveying device for conveying objects, said conveying device comprising:
a plurality of conveyor segments, each conveyor segment having a conveyor drive and a control unit with a microprocessor for controlling the conveyor drive; and
a bus communication to which the control units are connected,
said method comprising the steps of:
storing a first control configuration in a first electronic memory connected in the control unit to the microprocessor;
storing one or more second control configurations different from the first in a second electronic memory in the control unit;
processing control signals in the microprocessor and controlling a conveyor drive according to the control configuration, in a first operating mode;
receiving and processing a configuration change command received as a signal from a manual user interface connected to the microprocessor;
loading the second control configuration different from the first from the second memory into the first memory, wherein the second control configuration different from the first may be used to replace the first control configuration, and
processing control signals in the microprocessor and controlling a conveyor drive according to the second control configuration different from the first, in a second operating mode.

13. The method according to claim 12, wherein:
the first control configuration includes a first bus protocol for configuring data communication via bus communication, and the control unit sends and/or receives via bus communication in accordance with the first bus protocol, in the first operating mode; and
the second control configuration different from the first includes a second bus protocol different from the first and the control unit sends and/or receives via bus communication in accordance with the second bus protocol, in the second operating mode.

14. The method according to claim 12, wherein:
the first control configuration includes a first central control method, and the microprocessor receives control commands via bus communication in the first operating mode and routes said control commands to the conveyor drive; and
the second control configuration different from the first includes a second control method different from the first, and in the second operating mode the microprocessor:
receives a busy signal and/or a conveying signal from a control unit of a neighbouring conveyor segment;
logically processes said busy signal and/or conveying signal;
generates a control command in said logical processing; and
sends said control command to the conveyor drive.

15. The method according to claim 12, wherein the microprocessor emits via a visual user interface a signal for displaying and/or selecting the first and second different control configuration.

16. The method according to claim 12, wherein the conveying device in the first control configuration controls a first conveying mode via the microprocessor, and
the conveying device in the second control configuration different from the first controls a second conveying mode different from the first via the microprocessor,
wherein the first and/or second conveying mode is selected from the group consisting of:
a single take-off mode in which the microprocessor activates the conveyor drive of a conveyor segment when it receives a signal indicating that a neighbouring downstream conveyor segment is not busy;

a block take-off mode in which the microprocessor activates the conveyor drive of a conveyor segment when it receives a signal indicating that the conveyor drive or a neighbouring downstream conveyor segment is activated;

a transfer mode in which the microprocessor is configured to control a conveyor drive and a transfer drive which horizontally inserts or ejects the conveyed object from the conveyor segment;

a lift mode in which the microprocessor is configured to control a conveyor drive and a lift drive which vertically inserts or ejects the conveyed object from the conveyor segment; or a sort mode in which the microprocessor is configured to receive a sorting signal and to control a conveyor drive and a sorting drive which sorts the conveyed object according to the received sorting signal into at least two or more different exits from the conveyor segment.

17. The method according to claim 12, wherein the manual user interface may include triggering of a switch with a magnetic signal, including a Reed contact or a Hall sensor.

18. The method according to claim 17, wherein the microprocessor receives via the manual user interface a selected control configuration displayed on the visual user interface.

19. The method according to claim 18, wherein the microprocessor receives via the manual user interface and displays on the visual user interface a signal for a first selection level between bus protocol selection or control method selection; and when bus protocol selection is selected in the first selection level, receives via the manual user interface and displays on the visual user interface in a second selection level a signal for selecting between different bus protocols; and when control method selection is selected in the first selection level, receives via the manual user interface and displays on the visual user interface in a second selection level a signal for selecting between different control methods.

20. A conveying device for conveying objects comprising:

a plurality of conveyor segments, each conveyor segment having a conveyor drive and a control unit for controlling the conveyor drive; and a bus communication, wherein each control unit is integrated into the bus communication to send and/or to receive control signals via bus communication, and wherein each control unit comprises:

a microprocessor for processing control signals;

a first electronic memory connected to the microprocessor, in which a first control configuration is stored, wherein the first control configuration includes a first bus protocol for configuring the data communication via the bus communication;

a second electronic memory, in which a second control configuration different from the first control configuration are stored, wherein the second control configuration different from the first includes a second bus protocol different from the first bus protocol for configuring the data communication via the bus communication; and a manual user interface connected to the microprocessor;

wherein the microprocessor is adapted:

to control the conveyor drive in a first operating mode with the control configuration stored in the first memory;

to load the second control configuration different from the first from the second memory into the first memory when a configuration change command is received; and to control the conveyor drive in a second operating mode with the second control configuration different from the first.

* * * * *